(12) United States Patent
Beck

(10) Patent No.: US 7,458,313 B2
(45) Date of Patent: Dec. 2, 2008

(54) TUBULAR PISTON FOR A PISTON ENGINE AND METHOD PRODUCING A TUBULAR PISTON

(75) Inventor: Josef Beck, Villingen (DE)

(73) Assignee: Brueninghaus Hydromatik, GmbH, Elchingen (DE)

( * ) Notice: Subject to any disclaimer, the term of this patent is extended or adjusted under 35 U.S.C. 154(b) by 497 days.

(21) Appl. No.: 10/543,880

(22) PCT Filed: Jan. 29, 2004

(86) PCT No.: PCT/EP2004/000799

§ 371 (c)(1),
(2), (4) Date: Jul. 27, 2005

(87) PCT Pub. No.: WO2004/070205

PCT Pub. Date: Aug. 19, 2004

(65) Prior Publication Data

US 2006/0130325 A1    Jun. 22, 2006

(30) Foreign Application Priority Data

Feb. 7, 2003    (DE)    ................................ 103 05 136

(51) Int. Cl.
*F01B 31/08*    (2006.01)
*F01B 31/10*    (2006.01)
*F16J 1/00*    (2006.01)

(52) U.S. Cl. ............................. 92/157; 92/176; 92/260
(58) Field of Classification Search ..................... 92/71, 92/157, 172, 176, 181 R, 260; 29/888.04
See application file for complete search history.

(56) References Cited

U.S. PATENT DOCUMENTS 3,319,575 A * 5/1967 Havens ......................... 92/260
5,265,331 A    11/1993 Engel et al.
5,642,654 A * 7/1997 Parekh et al. .................. 92/260
6,237,467 B1 * 5/2001 Beck ............................. 92/157

FOREIGN PATENT DOCUMENTS

| DE | 19706075 A1 | 2/1997 |
| DE | 19938046 A1 | 8/1999 |
| WO | WO2004/070205 A1 | 8/2004 |

* cited by examiner

*Primary Examiner*—Michael Leslie
(74) *Attorney, Agent, or Firm*—Scully, Scott, Murphy & Presser, P.C.

(57) ABSTRACT

The invention relates to a tubular piston for a piston engine, comprising a tubular section, a collar shaped region and a ball pivot formed thereon, and an inner tube arranged in an outer tube. A cavity is at least partially formed between the outer tube and the inner tube. Said cavity is sealed from the area surrounding the hollow piston in a pressure-tight manner, by a material, especially a solder material, which is arranged in the cavity in a positively locking manner by means of heating.

17 Claims, 2 Drawing Sheets

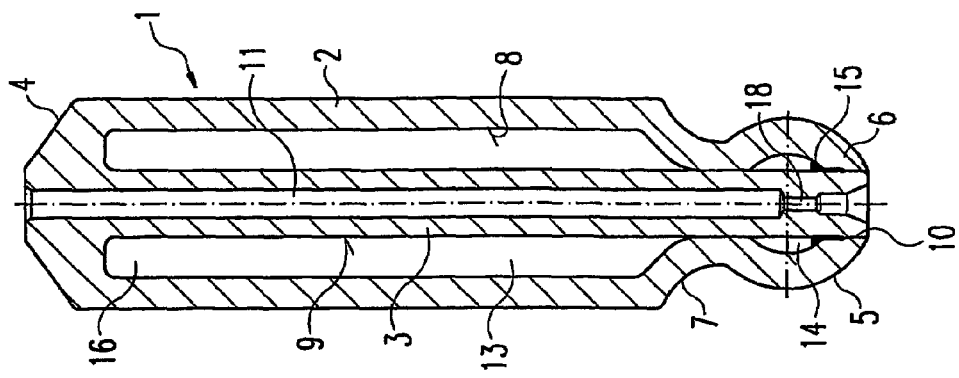
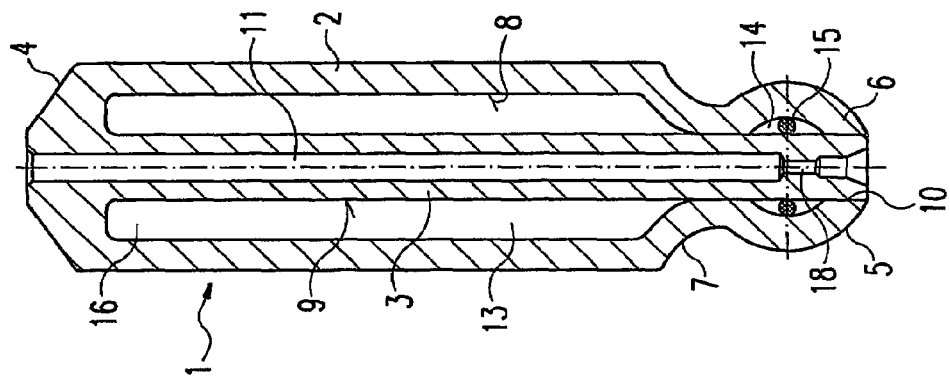
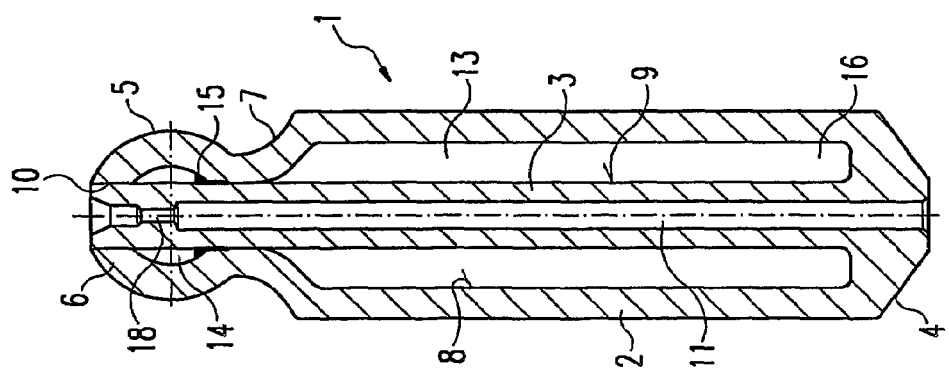
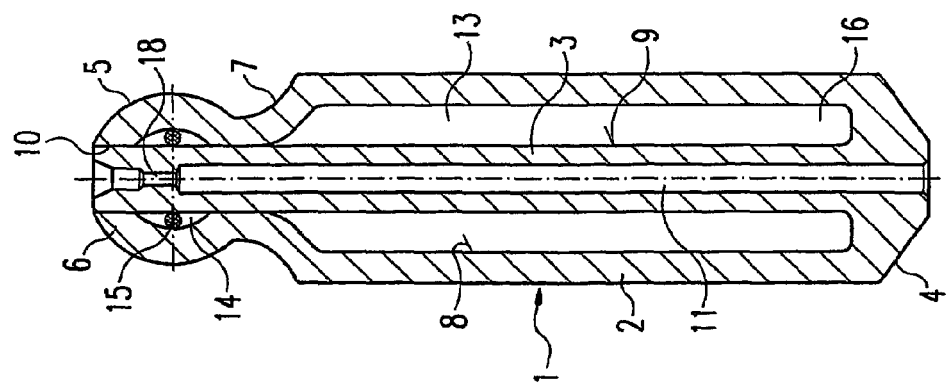

TUBULAR PISTON FOR A PISTON ENGINE AND METHOD PRODUCING A TUBULAR PISTON

The invention relates to a hollow piston for a piston machine according to the precharacterising clause of Claim 1 and to a method for producing such a hollow piston.

A hollow piston according to the precharacterising clause of Claim 1 and a method for producing a hollow piston are described in DE 199 38 046 A1. In this case, a hollow piston for a piston machine comprises a base section, from which a ball-joint part extends in one axial direction and a circumferential wall surrounding the hollow space of the hollow piston extends in the other axial direction, the hollow space being closed in the free end region of the hollow piston by a closing arrangement. In order to ensure simple and cost-effective production, the hollow piston is formed in one piece, and the closing arrangement is formed by a radially inwardly directed indentation of the circumferential wall.

Known from DE 197 06 075 A1 is a hollow piston for a hydrostatic machine having an outer tube, which is shaped to form a body part and a ball-joint part connected to the body part via a neck part, and an inner tube extending inside the outer tube over the entire length of the latter. The outside diameter of the inner tube and the inside diameter of the outer tube are dimensioned here such that a hollow space is formed between the inner tube and the outer tube at least in the region of the body part, the outer tube and the inner tube each being produced from a hollow-cylindrical blank of uniform wall thickness. The blank forming the outer tube is deformed here by rolling or rotary kneading such that from this hollow-cylindrical blank forming the outer tube are formed the ball-joint part and the neck part connecting the ball-joint part to the body part. The outer tube is deformed here to the extent where, in its end regions, it bears against the inner tube.

The disadvantage with this hollow piston is in particular that the rotary-kneading operation does not ensure that the hollow piston is pressure-tight towards the working medium of the axial piston machine. As a result, working medium may be forced into the hollow pistons, thereby adversely affecting the running properties owing to the weight increase and the resulting imbalances.

Accordingly, the object on which the invention is based is to design a hollow piston according to the precharacterising clause of Claim 1 such that the influx of working medium into the hollow piston during functional operation is avoided, and to specify a method for producing the hollow piston according to the invention.

This object is achieved with regard to the hollow piston by the features of Claim 1 and with regard to the production method by the features of Claim 17 or 18.

Advantageously, hollow pistons of both single- and multi-part form can be provided with one or more thermally deformable materials, in particular solder materials, which, on heating, seep into the regions of abutment of the tubes forming the hollow piston and thereby close these regions pressure-tightly. Besides a solder material, a thermoplastic plastics material, for example, is also possible.

It is particularly advantageous to shape the hollow piston, and the ball head formed thereon, by rotary kneading, which is simple and cost-effective.

A particularly simple and therefore cost-effective production variant is to form the hollow piston from two straight tubes of different diameters, which are pushed one into the other and likewise shaped by rotary kneading. Subsequent heating also ensures here the seeping of the materials, in particular solder materials, into the regions of abutment of the tubes.

A hollow space is formed between the tubes, which advantageously makes the hollow piston light and thereby provides it with good dynamic properties.

A through-bore enables hydrostatic relief of the running surfaces of the slide shoes connected to the hollow piston via a ball joint.

The invention and further advantages which can be obtained thereby are explained in more detail below with the aid of preferred embodiments and drawings, in which:

FIGS. 1A-1B show a sectional illustration of a first exemplary embodiment of a hollow piston according to the invention in two production steps;

FIGS. 2A-2B show a sectional illustration of a second exemplary embodiment of a hollow piston according to the invention in two production steps.

Figure 3A:
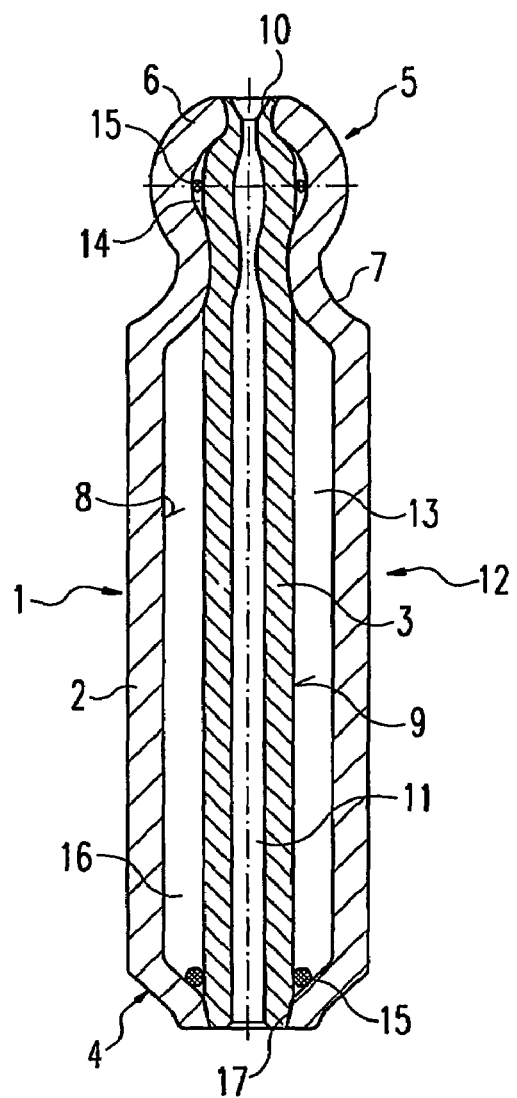
FIGS. 3A-3B show a sectional illustration of a third exemplary embodiment of a hollow piston according to the invention in two production steps.

A hollow piston 1, for example for an axial piston machine or radial piston machine (not illustrated specifically), has an outer tube 2 and an inner tube 3 arranged therein. In the exemplary embodiments illustrated in FIGS. 1A and 1B and also 2A and 2B, the inner tube 3 is produced in one piece with the outer tube 2, for example by the method described in DE 199 38 046 A1. The hollow piston 1 is thus closed off at a first end 4 from an area surrounding the hollow piston 1. The use of tubular basic elements makes the hollow piston 1 very light, providing it with good running properties.

A ball head 6 is formed at a second end 5 of the hollow piston 1. This head is integrally formed on the outer tube 2 of the hollow piston 1, for example by rotary kneading, so as to create a collar-shaped section 7. In the region of the collar-shaped section 7, an inner wall 8 of the outer tube 2 bears against an outer wall 9 of the inner tube 3. The ball head 6 is shaped, likewise by rotary kneading, so as to create a region of abutment 10 against the inner tube 3.

Running inside the inner tube 3 is an axial bore 11, which extends through the entire hollow piston 1 from the first end 4 to the second end 5. The bore 11 enables hydrostatic relief of the running surface of a slide shoe connected to the hollow piston at the ball head. The bore 11 may have a restricting point 18, which restricts the throughflow to a defined amount.

Since the pressures within the working medium during the operation of the axial piston machine are very high, it is possible for working medium to be forced into an inner space 13 of the hollow piston 1 in the region of abutment 10. As a result, the hollow piston 1 loses its running properties at least partly due to the weight increase, and this can lead to erratic running or damage of the piston machine owing to imbalances.

To counteract this, the invention provides for sealing measures in order to close off the hollow space 13 of the hollow piston 1 pressure-tightly from the working medium of the axial piston machine. For this purpose, a thermally deformable material, preferably a solder material 15, is introduced into a first subregion 14 of the hollow space 13 in the region of the ball head 6 during the production of the hollow piston 1. This material may be, for example, of ring-shaped configuration and consist of hard solder. Thereafter, the hollow piston 1 is finished. Subsequently, the hollow piston 1 is heated, as a result of which the material, preferably solder material 15, is liquefied and seeps between the inner wall 8 of the outer tube 2 and the outer wall 9 of the inner tube 3, thus producing a pressure-tight seal against the working medium. A thermoplastic plastics material is also possible instead of a solder material.

In FIGS. 1A and 1B, the hollow piston 1 here is heated while standing on its first end 4, whereas the hollow piston in FIGS. 2A and 2B is heated while standing on its second end 5 or on the ball head 6. In the first case, the material, preferably solder material 15, runs into the collar-shaped region 7, as a result of which there is still a possibility of slight amounts of the working medium penetrating through the region of abutment 10 into the first subregion 14 of the hollow space 13 in the region of the ball head 6. This can be avoided by the "head-down" heating illustrated in FIGS. 2A and 2B, where the material, preferably solder material 15, seeps into the region of abutment 10 and seals off both the first subregion 14 and a second subregion 16 of the hollow space 13 pressure-tightly from the working medium.

A particularly simple method for producing a hollow piston 1 is to insert a straight inner tube 3 of uniform thickness into a similarly straight outer tube 2, as can be found in DE 197 06 075 A1. The latter is then shaped at the ends 4 and 5 and also in the collar-shaped region 7 by rotary kneading to form a hollow piston 1. The disadvantage with this method, however, is that there are two regions of abutment 10, 17 at which working medium can be forced into the hollow space 13. In order to prevent this, solder materials 15 in the shape of a ring are inserted both into the first subregion 14 and into the second subregion 16 of the hollow space 13 before the rotary kneading, as illustrated in FIG. 3A. After completion of the rotary-kneading operation, the hollow piston 1 is likewise heated, as a result of which the materials, preferably solder materials 15, seep into the regions of abutment 10 and 17 and close these pressure-tightly.

Figure 3B:
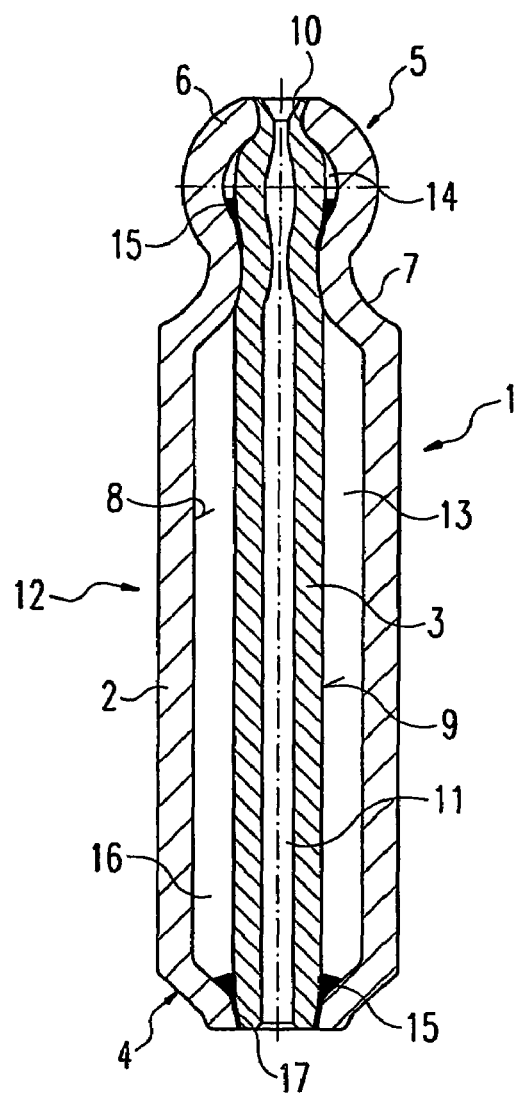

FIGS. 3A and 3B show a variant of the above-described method. In this exemplary embodiment, the hollow piston 1 is in the "upright" position, i.e. with the ball head 6 oriented upwards, so that the materials, preferably solder materials 15, seep into the collar-shaped region 7 and also into the second region of abutment 17. Here, as before, there is a possibility of the working medium penetrating into the first subregion 14 of the hollow space 13. In order to prevent this, it is possible, for example, first to heat the end 4 of the hollow piston 1, so that the material, preferably solder material 15, seeps into the region of abutment 17, and then by rotating the hollow piston 1 to heat the region of the ball head 6, so that the material, preferably solder material 15, arranged there seeps into the region of abutment 10.

Here, two solder materials 15 with different melting points may also be used, i.e. the solder material 15 for closing the region of abutment 17 has a different melting point from the solder material 15 for closing the region of abutment 10. While on heating to a first temperature initially only the solder material for closing the region of abutment 17 is liquefied, after subsequent rotation of the hollow piston 1 and heating to a second temperature higher than the first temperature subsequently the solder material for closing the region of abutment 10 is liquefied, or vice versa. This ensures that the solder material at the end 5 does not seal off the collar region 7, but rather the region of abutment 10 at the outside.

The invention claimed is:

1. Hollow piston for a piston machine, comprising a tubular section, a collar shaped region and a joint ball, which is integrally formed on the collar shaped region, and also an inner tube arranged in an outer tube, a hollow space being formed, at least partly, between the outer tube and the inner tube, wherein the hollow space is closed off pressure tightly from the area surrounding the hollow piston by a solder material, said solder material being arranged in the hollow space and, responsive to heating thereof, seeps into a region in said hollow space between said inner tube and an interior wall of said joint ball so as to form a pressure-tight sealing closure in said region between said inner tube and said interior wall of said joint ball.

2. Hollow piston according to claim 1, wherein the inner tube extends over the axial length of the outer tube.

3. Hollow piston according to claim 1, wherein the inner tube is formed in one piece with the outer tube.

4. Hollow piston according to claim 1, wherein the hollow piston is closed off at an end opposite the joint ball.

5. Hollow piston according to claim 1, wherein a bore of the inner tube extends through the hollow piston and the joint ball formed thereon.

6. Hollow piston according to claim 1, wherein the outer tube bears against the inner tube in the region of the collar shaped region.

7. Hollow piston according to claim 6, wherein the solder material is arranged in the region of a ball head of said joint ball between a region of abutment of the inner tube against the outer tube and the collar shaped region.

8. Hollow piston according to claim 7, wherein the solder material, is in a pressure-tight closure with the wall of the hollow piston in the region of abutment between the inner tube and the outer tube in the region of the ball head.

9. Hollow piston according to claim 8, wherein the solder material, seals off pressure-tightly a first subregion in the region of the ball head and a second subregion of the hollow space which is separated from the first subregion by the collar shaped region.

10. Hollow piston according to claim 1, wherein the inner tube is pushed into the outer tube.

11. Hollow piston accordingly to claim 10, wherein an end of the outer tube opposite the joint ball is closed by rotary kneading.

12. Hollow piston according to claim 11, wherein the solder material, is arranged in a first subregion of the hollow space between the joint ball and the collar shaped region.

13. Hollow piston according to claim 11, wherein a further solder material, is arranged in a second subregion between the end of the hollow piston and the collar shaped region.

14. Hollow piston according to claim 13, wherein the solder materials are in a pressure-tight closure with selectively a wall or the hollow piston at the rotary kneaded end of the outer tube and in the second subregion between the end of the hollow piston and the collar shaped region.

15. Method for producing a hollow piston for a piston machine, comprising a tubular section, a collar shaped region and a joint ball, which is integrally formed on the collar shaped region, and also an inner tube arranged in an outer tube, a hollow space being formed, at least partly, between the outer tube and the inner tube, the hollow space being closed off pressure-tightly from the area surrounding the hollow piston by a solder material, which is arranged in the hollow space and is brought into form closure with at least one wall of the hollow space by heating, comprising the following method steps:

production of a one-piece hollow piston insertion of the solder material, near the end of the hollow piston rotary kneading of the collar shaped region and of the joint ball, and heating of the hollow piston to cause the solder material to seep into a region of abutment and/or the collar-shaped region.

16. Method for producing a hollow piston for a piston machine, comprising a tubular section, a collar-shaped region and a joint ball, which is integrally formed on the collar-shaped region, and also an inner tube arranged in an outer tube, a hollow space being formed, at least partly, between the outer tube and the inner tube, the hollow space being closed off pressure-tightly from the area surrounding the hollow piston by a solder material, which is arranged in the hollow space and is brought into a sealing fit with at least one wall of the hollow space by heating, comprising the following method steps:

pushing of a straight inner tube into a straight outer tube, introducing two solder materials, near the ends of the tubes, rotary kneading of the ends and also of the collar-shaped region, and heating of the hollow piston to cause the solder materials, to seep into the regions of abutment and/or the collar-shaped region.

17. Method according to claim 16, wherein the last method step comprises the following method steps:

heating of the first end of the hollow piston to cause the solder material to seep into a region of abutment, rotation of the hollow piston, and heating of a second end of the hollow piston in the region of the ball head to cause the solder material to seep into a region of abutment.

* * * * *